Dec. 30, 1941.  C. N. KIMBERLIN, JR  2,268,401
ISOMERIZATION PROCESS
Filed March 23, 1940
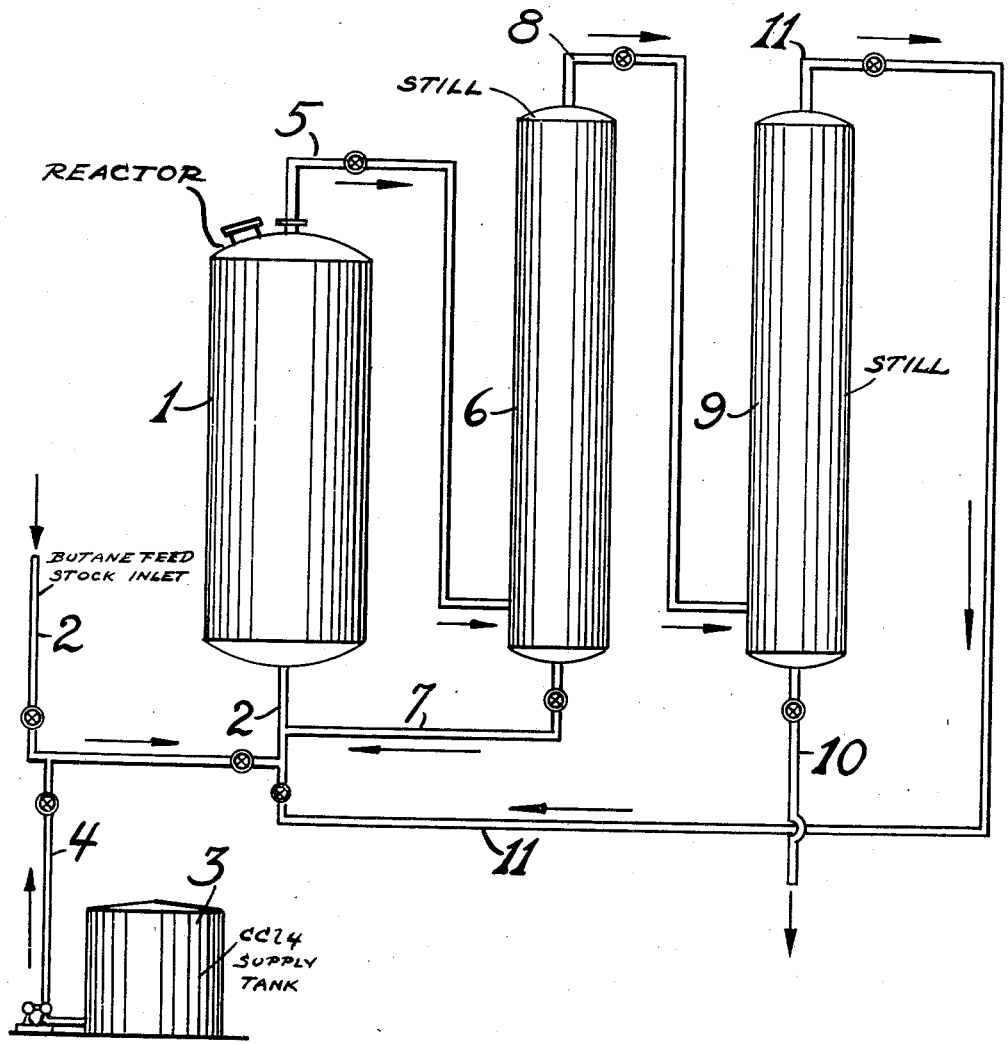

Patented Dec. 30, 1941

2,268,401

UNITED STATES PATENT OFFICE 2,268,401

ISOMERIZATION PROCESS

Charles N. Kimberlin, Jr., Baton Rouge, La., assignor to Standard Oil Development Company, a corporation of Delaware Application March 23, 1940, Serial No. 325,484

3 Claims. (Cl. 260—676)

This invention relates to an improved method for isomerizing paraffin hydrocarbons and more particularly to a method in which a catalyst and a catalyst activator are used to promote the reaction.

It is known that normal paraffin hydrocarbons can be isomerized by means of metal halide catalysts such as aluminum chloride or bromide, zinc chloride, ferric chloride, or the like. It is likewise known that the catalyst in almost every case requires an activator, since without such activator its activity diminishes very rapidly. As activators, hydrogen halides, such as hydrogen chloride, have been mainly employed.

In continuous processes for carrying out the isomerization reaction with the use of hydrogen halide as an activator for the catalyst, or in processes involving a series of batch operations, the valuable hydrogen halide may be separated from the isomerized hydrocarbon product and recycled to the reaction zone for further promotional effect, since the activator is not destroyed by the reaction. While most of the hydrogen halide may be recovered in this manner, there are inevitable small losses, generally much less than 10% during the completion of a single cycle, which cannot be prevented. This loss of hydrogen halide, such as hydrogen chloride, may, of course, be made up by continuously or intermittently introducing a small supply of the activator into the reaction zone.

In accordance with the present invention, the small losses of hydrogen halide in the process are made up by adding small quantities of an alkyl halide to the system instead of the hydrogen halide itself. The alkyl halide, under the conditions present in the reaction zone, will react with the hydrocarbons present to liberate hydrogen halide, which will then act as the activator for the reaction and maintain the necessary concentration of the hydrogen halide in the system. This method offers the special advantage that the alkyl halides are usually liquids and may be easily and cheaply transported, while a supply of hydrogen halide, such as hydrogen chloride, which is a gas, under ordinary conditions would have to be handled in pressure cylinders. The advantages of the use of an alkyl halide, such as carbon tetrachloride, are particularly obvious in cases where the isomerization process is carried on at distant and inaccessible locations, which would normally require considerable handling and long distance transportation of a hydrogen halide gas. The alkyl halides of the present invention are preferably the poly- halides which contain a large proportion of halogen, since a larger amount of hydrogen halide can be derived from a given weight of such a compound. Where hydrogen chloride is the catalyst activator used, carbon tetrachloride has been found to be particularly suitable as a source of supply for the making up of losses. This material is a liquid and is cheap and easily handled.

An additional advantage in the use of a small quantity of an alkyl halide in addition to the hydrogen halide as catalyst activator is derived from the fact that alkyl halides, such as carbon tetrachloride, are superior to hydrogen halides as activators. It has been found by actual test, for example, that a given percentage of carbon tetrachloride, e. g. 2%, gives a greater percentage isomerization of n-butane in the presence of aluminum chloride catalyst in a single cycle of operation than does an equal amount of hydrogen chloride under identical conditions. Experience has further shown, however, that carbon tetrachloride alone is not very desirable as an activator, since with its use the catalyst deteriorates to a certain extent after a few cycles of operation, owing, apparently, to the formation of aluminum chloride complexes as a result of the reaction of the carbon tetrachloride with the hydrocarbons of the feed stock. However, small quantities of these complexes have been found to be active promoters of isomerization; hence, the use of relatively small quantities of an alkyl halide avoids the rapid deterioration of catalyst and at the same time provides for a somewhat greater rate of isomerization.

It should be understood that the above-described advantages of adding small quantities of an alkyl halide to the system are not restricted to cases in which a hydrogen halide is originally present as the sole catalyst activator or as one of a plurality of activators. Other substances may be employed as the activator, such as water or both hydrogen halide and water. Whatever activator may be used, the alkyl halide additions will provide for the formation of small quantities of a hydrogen halide in the reactor, which will serve to compensate for losses of the principal activator during the operation.

The present process is applicable in general for the conversion of paraffins, in particular normal paraffins, such as normal butane, normal pentane, normal hexane, normal heptane and their homologs into their corresponding branched iso forms, such as isobutane, isopentane, and the like. The feed stocks also may comprise mixtures of more than one of these straight chain paraffins or, if convenient, the paraffinic mixture may contain small proportions of branched chain paraffins although for greater efficiency the hydrocarbon feed stocks should comprise essentially straight chain paraffins. The invention is not limited to the isomerization of straight chain hydrocarbons. It includes also the conversion of branched chain paraffins into isomeric more highly branched hydrocarbons. Mixed paraffins, such as straight run naphthas, may by the present method be converted into isomeric mixtures which have an increased value with respect to anti-detonation qualities when used as motor fuels and with respect to the facility with which they may enter into further chemical reactions to produce alkylation products when reacted with olefins. In general, any hydrocarbon mixture composed predominantly of paraffin hydrocarbons is suitable for use as a feed stock for the process herein outlined. A product containing substantial amounts of branched chain isomers may be separated from the reaction medium and fractionated within the desired boiling range. The constituents boiling above and below the desired boiling range may then be returned to the isomerizing reactor to suppress their further formation or to be further isomerized to more useful products. The fractions containing the low boiling materials will contain most of the hydrogen halide used in the reaction, which will thereby be returned to the reaction zone.

In the isomerizing reactions contemplated in connection with the present invention a wide temperature range may be employed, for example, from about —50° to about 400° F. The higher temperatures, i. e. from 300° to 400° F., are preferably employed when the feed stocks are in vapor phase, but under these conditions there may be some decomposition at the same time. At the lower temperatures, for example from —50° to 250° F., isomerization may be effected in the liquid phase and without side reactions. The time of the reaction varies with other factors, such as temperature, the amount of catalyst, the particular catalyst used and the particular feed stock treated. In general, however, the time of reaction may be from one-half to 30 hours, and the conditions are usually adjusted so as to obtain a conversion of 50% to 75%, at a temperature, for example, of 150° to 250° F. for butane and 30° to 100° F. for pentane.

The amount of catalyst to be used varies widely, depending upon the particular hydrocarbon which is to be converted, the amounts ranging from 2% to 150% by weight of hydrocarbon material present in the reactor. For the conversion of butane in the presence of aluminum chloride it is advantageous to use about 10 to about 50%, preferably about 15% to 40%, by weight of aluminum chloride, and 2% to 10% by weight of hydrogen chloride.

The amount of alkyl halide which must be added to the system to make up for losses of hydrogen halide in a process such as that described will depend, of course, upon the extent of such losses. Under normal conditions these losses would be well below 10% per pass and the amount of hydrogen halide to be added will be much less than that which would be sufficient to cause any substantial activation of the catalyst without the considerably larger amount of hydrogen halide already present. In the case of the isomerization of normal butane, when 10% to 50% of aluminum chloride is present in the reactor as the catalyst, and 2% to 10% of hydrogen chloride is present as the promoter, it has been found that the concentration of hydrogen chloride may ordinarily be maintained constant by adding to the system between 0.025% and 0.2%, preferably about 0.05%, by weight of carbon tetrachloride, based upon the weight of the hydrocarbon feed being introduced.

The reaction is preferably carried out under liquid phase conditions. Hence, any temperature below the critical temperature of the feed stock may be employed, although it is preferable to use the temperatures specified above. Sufficient superatmospheric pressure may be employed to maintain the reactants as well as the reaction products in the liquid phase under the reaction conditions obtained. In particular, the liquid phase reactions are conducive to the production of ultimate high yields and to carrying out the process in a continuous manner. In a continuous flow process, the normal paraffin is passed in vapor or liquid condition through a reaction vessel containing the catalyst, which may be in lump or powdered form or may be supported on a carrier such as silica, activated carbon, asbestos, pumice and the like. The catalyst may also be used in finely divided form and may be passed through the reaction zone suspended in the materials being treated. The catalyst may consist entirely of metal halides of the Friedel-Crafts type or may be modified by the addition of alkali or alkaline earth halides, such as potassium or sodium halides, etc.

The invention may also be practiced by employing a "continuous batch" type of operation, in which the reaction is carried out in liquid phase and the liquid product, containing some dissolved hydrogen halide, is removed after each batch reaction and distilled to separate the isomerized product from bottoms and from light ends. The latter, containing most of the hydrogen halide which was removed from the reactor, are stored in a convenient vessel and returned to the reaction zone in a subsequent charge. In this type of operation, the liquid hydrocarbon feed may be forced into the reactor under pressure through jets of restricted internal diameter; and turbo mixers or similar dispersion means may be employed for increasing intimacy of contact between the catalyst and the feed. The direction of flow of the feed stock may be upward or downward through the catalyst bed; but where a powdered catalyst is used, an upward flow is desirable. At the end of each batch reaction the agitation is discontinued and the liquid product is drawn off, leaving intact the catalyst bed and the gaseous phase containing hydrogen halide vapors. The apparatus is then ready for the introduction of a fresh batch of feed and recovered hydrogen halide, together with a small amount of alkyl halide.

A preferred embodiment of the present invention is described in connection with the accompanying drawing, which illustrates an apparatus suitable for the continuous conversion of normal butane into isobutane. For this reaction a concentration of about 15% by weight of aluminum chloride is maintained in reactor 1, where the reaction takes place at about 212° F. For the activation of the catalyst, a concentration of about 2% of hydrogen chloride is also maintained in the reactor. The normal butane feed stock is introduced into the reactor through line 2. A small amount of carbon tetrachloride is added to the system through line 4, which leads from a supply tank 3 to the feed line 2. The products of the reaction pass out in vapor phase through line 5 to still 6, where the unconverted normal butane carried over by the vapors is separated and returned to the reactor by means of line 7. The overhead products from still 6 pass through line 8 to still 9, where further fractionation occurs. The isobutane product is removed as bottoms through line 10, while the lower boiling by-products and hydrogen chloride are together removed as overhead through line 11 and returned to the reactor 1.

In accordance with the present invention, other metal halides than those described in connection with the specific embodiments of the present process may be employed as catalyst, such as aluminum bromide, zinc chloride, ferric chloride and other catalysts of the Friedel-Crafts type. Other hydrogen halides may be used in place of hydrogen chloride, such as hydrogen bromide or hydrogen iodide, while other alkyl halides than those described, such as, for example, ethyl chloride, ethyl bromide, and the like, may be used for making up losses in the hydrogen halide concentration.

The present invention is not to be limited by any theory of the reaction mechanism or by any of the examples which are given by way of illustration but only by the following claims in which it is desired to claim all novelty inherent in the invention.

I claim:

1. A process for isomerizing paraffin hydrocarbons which comprises charging a reactor with a hydrocarbon, a Friedel-Crafts type catalyst for the isomerizing reaction and a hydrogen halide activator for said catalyst, bringing the reaction mixture to an isomerizing temperature, continuously removing the reaction product from the reactor, continuously separating the catalyst and the activator from the desired isoparaffin product and returning them to the said reactor, continuously feeding a fresh supply of hydrocarbon to the reactor, and adding a small supply of alkyl halide to the reaction mixture in sufficient amounts and as required to make up as catalyst activator for small losses of the said hydrogen halide activator during the process.

2. A process for isomerizing paraffin hydrocarbons which comprises charging a reactor with a hydrocarbon, an aluminum chloride catalyst for the isomerizing reaction and a small amount of hydrogen chloride as activator for said catalyst, bringing the reaction mixture to an isomerizing temperature, continuously removing the reaction product from the reactor, continuously separating the catalyst and activator from the desired isoparaffin product and returning them to the said reactor, continuously feeding a fresh supply of hydrocarbon to the reactor, and adding a small supply of carbon tetrachloride to the reaction mixture in sufficient amounts and as required to make up as catalyst activator for small losses of the said hydrogen chloride activator during the process.

3. A process for isomerizing normal butane to isobutane which comprises charging a reactor with normal butane, about 10% to about 50% of aluminum chloride as a catalyst and about 2% to about 10% of hydrogen chloride, bringing the reaction mixture to an isomerizing temperature, continuously removing the reaction product from the reactor, continuously separating the aluminum chloride, hydrogen chloride and unreacted normal butane from the isobutane formed and returning them to the said reactor, continuously feeding a fresh supply of normal butane to the reactor, and adding a small supply of carbon tetrachloride to the reaction mixture in sufficient amounts and as required to make up as catalyst activator for small losses of the said hydrogen chloride during the process.

CHARLES N. KIMBERLIN, Jr.